United States Patent [19]

Sanders

[11] Patent Number: 4,723,800
[45] Date of Patent: Feb. 9, 1988

[54] BI-STEM GRIPPING APPARATUS

[75] Inventor: Fred G. Sanders, Huntsville, Ala.

[73] Assignee: The United States of America as represented by the Administrator, National Aeronautics and Space Administration, Washington, D.C.

[21] Appl. No.: 56,930

[22] Filed: Jun. 3, 1987

[51] Int. Cl.⁴ .......................... F16C 1/26; F16C 29/00
[52] U.S. Cl. ...................................... 294/16; 294/106; 294/113; 294/119.2
[58] Field of Search ...................... 294/16, 1.1, 11, 15, 294/17, 62, 66.1, 67.33, 82.35, 86.4, 102.1, 102.2, 106, 113, 114, 117, 119.1, 119.2, 137, 167, 169; 248/58, 62, 65, 74.1

[56] References Cited

U.S. PATENT DOCUMENTS

| | | | |
|---|---|---|---|
| 601,639 | 4/1898 | Doyle | 294/16 |
| 2,819,111 | 1/1958 | Cozzens | 294/16 |
| 4,072,369 | 2/1978 | Segreto | 294/16 |

*Primary Examiner*—James B. Marbert
*Attorney, Agent, or Firm*—William J. Sheehan; John R. Manning; Leon D. Wofford, Jr.

[57] ABSTRACT

An apparatus (23) is constructed having a pair of side gripping members (32, 34) which are pivotally coupled by hinges to an intermediate gripping member (36). These gripping members (32, 34, 36) have a l/d (length-to-diameter) ratio of approximately 5:1 to distribute compressive forces over a relatively large area. Inner gripping regions (46, 48, 50) of the members (32, 34, 36) are configured having frictional surfaces (46, 48, 50) which frictionally grip a tubular structure, such as a bi-stem (12). A latch (51) having catches (56) is positioned on one of side gripping members (34), and a catch (62) is positioned on the opposite side member (32) for engaging the catches (56), latching the apparatus (23) closed around the bi-stem (12). Handles (68, 70) are centrally affixed to an exterior region of side members (32, 34) and allow the apparatus (23) to be readily closed around the bi-stem (12) and also allow manipulation of the bi-stem (12). These handles may be removed when the apparatus (23) is used as a repair device.

6 Claims, 7 Drawing Figures

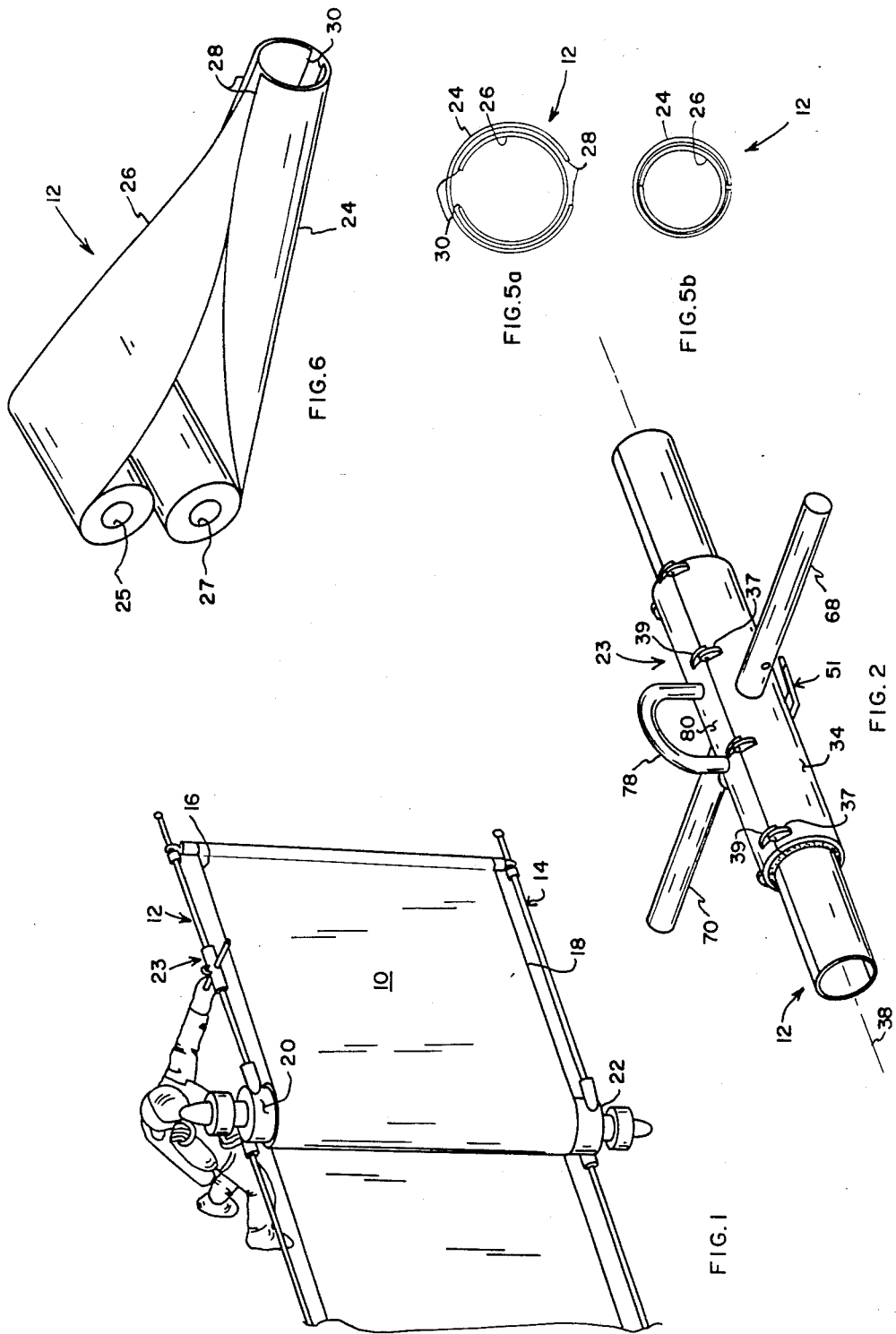

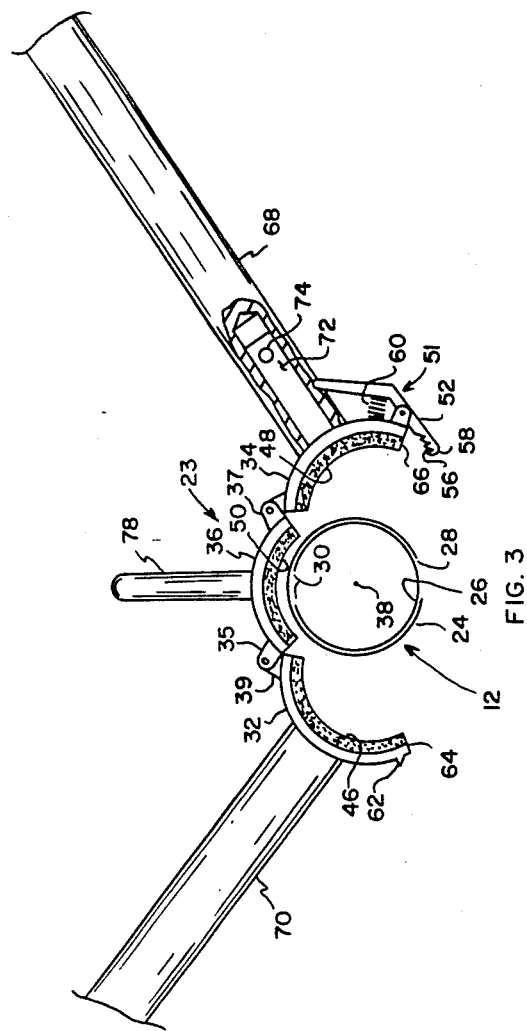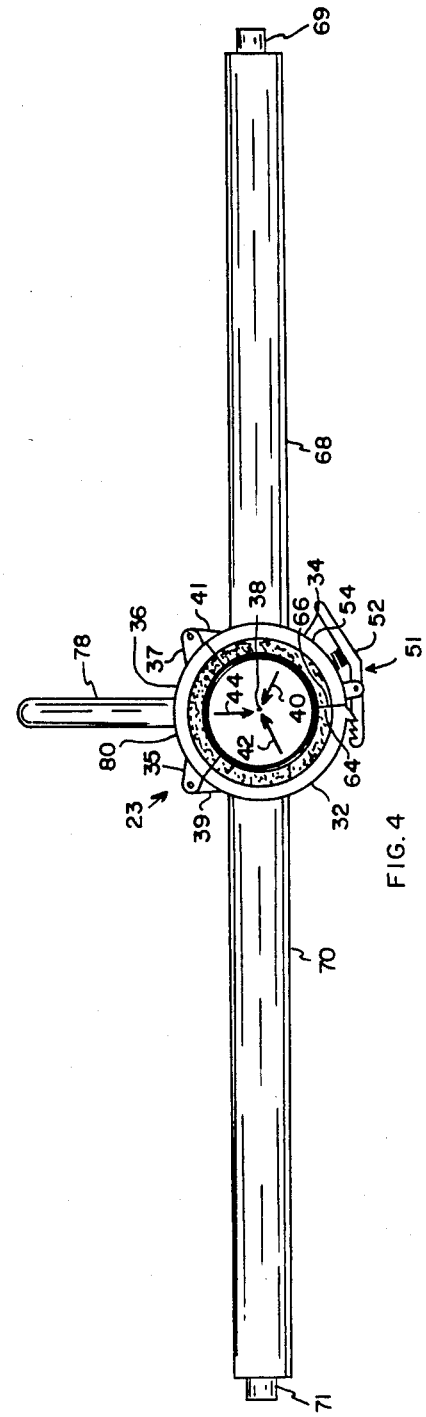

BI-STEM GRIPPING APPARATUS

ORIGIN OF THE INVENTION

The invention described herein was made by an employee of the United States Government and may be manufactured and used by or for the Government for Government purposes without the payment of any royalties thereon or therefor.

TECHNICAL FIELD

This invention relates generally to devices for gripping cylindrical objects and more particularly to a device having frictional gripping surfaces which distribute the gripping force over a relatively large area of the cylindrical object.

BACKGROUND OF THE INVENTION

As the technologies relating to space travel have improved, it has become desirable to deploy satellites in either orbital positions around stellar bodies, including Earth, or to direct satellites in trajectories calculated to fly by or to land on stellar bodies in order to collect data about them.

Increasingly, these satellites are being initially deployed, or sometimes repaired, by extravehicular activities (EVA) crew men who, appropriately garbed, exit a manned spacecraft to accomplish these tasks. The deployment of satellites involves several steps in which a satellite is transformed from a compact, tightly packaged unit configured to be shipped into orbit to an unwieldy apparatus which, in some cases, have large solar panels resembling wings, sails, or other configurations. Additionally, antennas and various types of equipment must be electromechanically deployed and supported by struts which in some manner must be compact for shipment into space but capable of being extended during deployment of the satellite.

One such device which is capable of being compactly stored for delivery into space yet extendable to form a support strut once in space is termed a bi-stem. It consists of exterior and interior thin, stainless steel bands, with the exterior band configured to laterally encircle the interior band to form a tubular structure. In order to store these bands for delivery into space, the bands are laterally straightened, and each is rolled onto a roller which is mounted in a cassette. Once in space, the rollers are driven so as to drive the bands out of the cassette, allowing the exterior band to encircle the inner band and form a bi-stem.

Problems have occasionally arisen when attempting to drive the bands out of the cassette, which causes them to become jammed in the cassette. When this occurs, and if the deployment of the satellite is during a manned flight, the astronauts may attempt to free the jammed bi-stem. To do this, they would have to grasp the bi-stem with a gloved hand and attempt to pull it out of the cassette. The problem with this is that a human hand inside a spacesuit glove cannot distribute the force necessary to grasp the bi-stem without crushing or otherwise damaging it. Also, the spacesuit glove is relatively slippery against the smooth bi-stem and would tend to slip. Further, since the bi-stem has an exposed sharp longitudinal seam, the possibility exists that a glove could be punctured by this seam. Thus, in the event that the bi-stem cannot be easily freed, the equipment it supports cannot be properly deployed. In the instance where the jammed bi-stem is used to support or deploy one of several solar panels which generates electrical power for the satellite, then the remaining solar panels may not be able to provide sufficient electrical power for the satellite, which may then become partially or totally disabled. This would be an obviously expensive failure.

It is an object of the present invention to provide a device for application of gripping forces to a cylindrical object, the gripping forces being distributed over a relatively large surface of the cylindrical object.

It is a further object of this invention to provide a device which may be used by extravehicular crew men to free a jammed bi-stem from a cassette in which it is stored.

SUMMARY OF THE INVENTION

In accordance with this invention, a gripping apparatus for gripping tubular structures is constructed having a pair of elongated side gripping members each having arcuate inner gripping regions, and each pivotally coupled to an elongated central gripping member having a like configured arcuate inner gripping region. These inner gripping regions have frictional surfaces to prevent slippage of the apparatus on the tubular structure, and the pair of elongated side gripping members are equipped with a latch to lock the apparatus around the tubular structure. A handle is provided on each side gripping member and extends in normal relation therefrom to allow the cylindrical structure to be manipulated.

BRIEF DESCRIPTION OF THE DRAWINGS

FIG. 1 is a pictorial view illustrating a jammed bi-stem and an astronaut attempting to free the bi-stem with the bi-stem gripping apparatus of the present invention.

FIG. 2 is a pictorial view of a bi-stem gripping apparatus clamped onto a bi-stem.

FIG. 3 is an end elevational view of a bi-stem gripping apparatus positioned to be clamped around a bi-stem.

FIG. 4 is an end elevational view of a bi-stem gripping apparatus clamped around a bi-stem.

FIGS. 5a and 5b are sectional views of a bi-stem, with FIG. 5a showing the relaxed configuration of the bi-stem, and FIG. 5b showing the compressed configuration of the bi-stem.

FIG. 6 is a diagrammatic view of a pair of rollers onto which bands that form a bi-stem are stored, and which further illustrates the positioning of these rollers with respect to the formation of a bi-stem.

DESCRIPTION OF THE PREFERRED EMBODIMENT

Referring initially to FIG. 1, a solar array 10 is shown being deployed by bi-stems 12 and 14 positioned on sides 16 and 18, respectively, of array 10. Bi-stems 12 and 14 are stored in and deployed from cassettes 20 and 22, respectively, and, as shown, an astronaut is working to free upper bi-stem 12, it being assumed that it has incurred a jammed condition within its cassette 20. In order to attempt to dislodge bi-stem 12 from its jammed condition, the astronaut has clamped a bi-stem gripping apparatus 23 onto partially extended bi-stem 12 which allows him to safely manipulate bi-stem 12 while applying the necessary force to free the jam.

Bi-stem gripping apparatus 23 is more particularly illustrated in FIGS. 2, 3, and 4, and is shown in FIGS. 2 and 4 gripping bi-stem 12. Bi-stem 12 is constructed of a pair of thin, stainless steel bands 24 and 26 (FIGS. 5a, 5b, and 6) which are approximately 0.005" thick and approximately 2.35" wide. These bands are rolled onto rollers 25 and 27 (FIG. 6) within a cassette (FIG. 1), with rollers 25 and 27 being positioned to allow bands 24 and 26 to concentrically encircle one another when rollers 25 and 27 are driven in a direction which drives bands 24 and 26 out of the cassette. Edges 28 and 30 of bands 24 and 26, respectively, are positioned 180° apart and are gapped to provide bi-stem 12 with a diameter of approximately ⅞" when relaxed and approximately ¾" when compressed until edges 30 of inner band 26 abut.

Gripping apparatus 23, when closed about bi-stem 12 (FIGS. 3 and 4), forms a generally tubular structure which is laterally trisected into three equally sized gripping members 32, 34, and 36. Intermediate gripping member 36 is provided with hinge members 35 and 37, which are pivotally connected to hinge members 39 and 41 of side gripping members 32 and 34. These gripping members, when closed, have an inside diameter of approximately ¾" and a length of approximately 5". Thus, apparatus 23 has a length/diameter ratio of approximately 5:1. Apparatus 23 is constructed as such to distribute the compressive forces applied to bi-stem 12 over at least a predetermined length of bi-stem 12 (typically 5") to prevent it from being crushed. Additionally, these compressive forces applied by members 32, 34, and 36 are radially distributed around an axis 38 extending longitudinally through bi-stem 12, as indicated by vectors 40, 42, and 44, which are radially spaced approximately 120° apart. It is necessary to vector these forces as such in order to uniformly compress bi-stem 12. A construction of apparatus 23 having only two opposed gripping members is eliminated because of the fragile construction of bi-stem 22 (bands which are 0.005" thick). These two opposed gripping members would tend to compress bi-stem 22 into an oblong configuration, possibly damaging it.

Gripping members 32, 34, and 36 have arcuate inner gripping surfaces 46, 48, and 50, respectively, which are constructed of a frictional material. This material generally consists of a gum stock silicone rubber, such as G.E. 5211, which is manufactured by General Electric Company. It has been discovered that this particular compound is suitable for use in the vacuum and temperature conditions of space. This rubber is molded under heat and pressure into a sheet approximately ⅛" thick, having a durometer of approximately 25. These sheets are cut to size and bonded, as by rivets (not shown), to inner regions of members 32, 34, and 36, respectively.

A ratchet-type latch 51 positioned on side member 34 allows bi-stem gripping apparatus 23 to be locked in place around bi-stem 12. Latch 51 is constructed having a pawl member 52 (FIGS. 3 and 4) pivotally mounted to exterior region 54 of member 34. Pawl 52 has a linear series of catches 56 positioned on end 58, and a spring 60 biases end 58 inward toward axis 38 when apparatus 23 is closed around bi-stem 12. A catch 62 on opposite side member 32 engages catches 56 of pawl 52 and enables apparatus 23 to be latched at increasingly reduced diameters around bi-stem 12 until edges 64 and 66 of side members 32 and 34 abut. At this latched position, edges 30 of band 26 is also in an abutting relation, and bi-stem 12 is compressed to its minimum diameter of approximately ¾". Alternately, a cam-type latch or other latches suitable for use in space (not shown) may be used to pull members 32, 34, and 36 together and secure them in a latched configuration.

If desired, handles 68 and 70 may be made removable and mounted on stub shafts 72 (only one shown in FIG. 3) of side gripping members 32 and 34. These stub shafts 72 may incorporate openings 74 (only one shown), which are engaged by ball-type detent catches (not shown) built into handles 68 and 70. In the case where apparatus 23 is to be used in space, these detent catches would be PIP pin-type latches, which incorporate locks on the detent balls, providing positive latched engagement between handles 68 and 70 and stub shafts 72. In order to unlatch handles 68 and 70, buttons 69 and 71 are depressed, which disengage the balls, engaging openings 74 and enabling handles 68 and 70 to be removed. A tethering ring 78 is centrally affixed to an outer surface 80 of intermediate member 36 and provides a convenient point to which a lanyard (not shown) may be affixed. This lanyard would be attached at a opposite end to a second tethering point affixed to a structure (not shown). Tethering ring 78 may be omitted when apparatus 23 is to be used in a gravity environment, but is useful in space to prevent apparatus 23 from inadvertently drifting away and becoming lost.

In operation, and assuming that bi-stem gripping apparatus 23 is to be used in a microgravity environment, FIG. 1 illustrates an astronaut attempting to free jammed bi-stem 12. As shown, apparatus 23 is attached around bi-stem 12 by using handles 68 and 70 to radially compress bi-stem 12 to its minimum diameter, e.g., until edges 30 of band 26 abut (FIGS. 4 and 5b). In this configuration, frictional surfaces 46, 48, and 50 are fully engaged with bi-stem 12, and the astronaut is able to pull bi-stem 12 from its cassette 20 by applying force to handles 68 and 70 in a direction outward from cassette 20.

In the instance where bi-stem 12 has become damaged, as from micrometeorite hits or inadvertent collisions with other structures, apparatus 23 may be used as a splint or repair device. In this instance, a bent bi-stem may be straightened by clamping apparatus 23 around the bent region (not shown) of a bi-stem. As apparatus 23 is levered closed by handles 68 and 70, the bi-stem will be straightened. After latch 51 is engaged, handles 68 and 70 may then be removed and apparatus 22 left in place as a support for the damaged region. In the instance where it is anticipated that apparatus 23 is to be used as a repair device, it may be constructed longer than 5" to further distribute stresses over a larger area of the bi-stem.

From the foregoing, it is apparent that the applicant has provided an apparatus for securely gripping cylindrical objects while applying an evenly distributed gripping force along the length thereof; specifically, applicant has provided a bi-stem gripping apparatus 23 which may be used to manipulate a jammed bi-stem until it is free. Additionally, as desired, this apparatus may be used as a repair device to support a damaged bi-stem.

What is claimed is:

1. A gripping apparatus for gripping and manipulating cylindrical structures, said apparatus comprising:
  a pair of elongated side gripping members and an elongated intermediate connecting gripping member secured in pivotal relation therebetween, said members having arcuate inner gripping regions;

frictional gripping means secured to said inner gripping regions for frictionally gripping said structures;

latching means for latching said pair of elongated side gripping members and said elongated intermediate gripping member around said cylindrical structures, said members disposed for application of evenly distributed gripping forces to said cylindrical structures responsive to latching by said latching means; and a pair of handle means, each positioned on an exterior region of each of said pair of side gripping members, for manipulating said cylindrical structures.

2. A gripping apparatus as set forth in claim 1 wherein said frictional gripping means comprises a gum stock silicone rubber adapted for use in a vacuum.

3. A gripping apparatus as set forth in claim 2 wherein said handle means are centrally disposed on said exterior region of said pair of side gripping members, and said handle means extending outward normal to said side gripping members.

4. A gripping apparatus as set forth in claim 3 wherein said latching means comprises a pawl member pivotally disposed on an outer region of one of said pair of side gripping members, said pawl having a spring which biases an end of said pawl inward, said end having a linear series of catches disposed thereon and a mating catch disposed on an outer region of an opposite said side gripping member, said linear series of catches being aligned with said catch, whereby said gripping members are latched at increasingly reduced diameter positions around said structure until latched edges of said pair of side gripping members abut.

5. A gripping apparatus as set forth in claim 1 wherein said elongated gripping members are of a predetermined length/diameter ratio comprising approximately 5":1" ratio, whereby the concentration of radially compressive forces on said structure is prevented.

6. A gripping apparatus configured for use in a microgravity environment for gripping and radially compressing a bi-stem constructed of first and second thin, flexible steel bands disposed in concentric relation, said bi-stem having an axis extending longitudinally therethrough, and said gripping apparatus comprising a pair of side gripping members and an intermediate connecting gripping member pivotally disposed therebetween, said intermediate connecting member having a tethering ring affixed to an exterior region thereof, said gripping members having arcuate inner gripping regions configured to frictionally grip and radially compress said bi-stem about said axis, and latching means disposed on outer regions of said side gripping members for latching said gripping members around said bi-stem as said bi-stem is gripped and compressed, and removable handle means centrally disposed on exterior regions of each of said side gripping members, said handle means extending outward therefrom, for closing said gripping members about said bi-stem and manipulating said bi-stem, whereby three discrete vectors of force are applied by said gripping members to said bi-stem, said vectors being radially spaced approximately 120° about said axis.

* * * * *